US009525829B2

(12) United States Patent
Yamashita et al.

(10) Patent No.: US 9,525,829 B2
(45) Date of Patent: Dec. 20, 2016

(54) VIDEO DISPLAY APPARATUS, VIDEO SWITCHING APPARATUS, AND VIDEO DISPLAY METHOD

(71) Applicant: TOYOTA JIDOSHA KABUSHIKI KAISHA, Toyota-shi, Aichi-ken (JP)

(72) Inventors: Hiroaki Yamashita, Toyota (JP); Goro Asai, Toyota (JP); Makoto Nishida, Aichi-gun (JP); Yohei Satomi, Okazaki (JP); Masaaki Amano, Nagoya (JP); Yuka Shidochi, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 14/672,972

(22) Filed: Mar. 30, 2015

(65) Prior Publication Data

US 2015/0341568 A1    Nov. 26, 2015

(30) Foreign Application Priority Data

May 23, 2014    (JP) ................ 2014-107423

(51) Int. Cl.
*H04N 5/268* (2006.01)
*H04N 7/18* (2006.01)
*G08B 13/196* (2006.01)

(52) U.S. Cl.
CPC ............ *H04N 5/268* (2013.01); *G08B 13/196* (2013.01); *H04N 7/18* (2013.01); *H04N 7/181* (2013.01); *H04N 7/188* (2013.01)

(58) Field of Classification Search
CPC ....................................................... H04N 5/268
See application file for complete search history.

(56) References Cited

U.S. PATENT DOCUMENTS

| 4,218,709 | A | * | 8/1980 | Baxter et al. ................ 348/584 |
| 4,947,263 | A |   | 8/1990 | Yun |
| 5,264,929 | A | * | 11/1993 | Yamaguchi ................... 348/159 |
| 5,452,023 | A | * | 9/1995 | Kim ............................. 348/731 |
| 5,786,845 | A | * | 7/1998 | Tsuria ............................ 725/32 |
| 6,091,459 | A | * | 7/2000 | Masaike ...................... 348/569 |

(Continued)

FOREIGN PATENT DOCUMENTS

| CN | 101426078 A | 5/2009 |
| DE | 38 25 540 A1 | 2/1989 |
| JP | 2008-099254 A | 4/2008 |

*Primary Examiner* — Brian Yenke
(74) *Attorney, Agent, or Firm* — Oliff PLC

(57) ABSTRACT

A video display apparatus includes video output units to output signals representing first videos captured or received, respectively, and when a predetermined signal is input from an outside, only for a predetermined period, to output signals representing second videos having fixed images, instead of the signals representing the first videos, respectively; a display to display a video based on the signal output by one of the video output units; and a control apparatus to output the predetermined signal to the video output units, and after having output the predetermined signal, to execute switching a signal representing a video output to the display among the signals representing the videos output by the video output units, while the video output units having the signals representing the videos output to the display before and after the switching, respectively, output the signals representing the second videos, respectively.

6 Claims, 2 Drawing Sheets

(56) References Cited

U.S. PATENT DOCUMENTS

| | | | |
|---|---|---|---|
| 6,215,781 B1* | 4/2001 | Kato et al. | 370/345 |
| 6,519,011 B1* | 2/2003 | Shendar | 348/731 |
| 6,529,246 B1* | 3/2003 | Maeda | 348/570 |
| 6,836,297 B2* | 12/2004 | Maeda | 348/569 |
| 7,065,140 B1* | 6/2006 | Ritter et al. | 375/240.25 |
| 7,245,664 B1* | 7/2007 | Ohnami | 375/240.28 |
| 7,589,789 B2* | 9/2009 | Choi | 348/441 |
| 7,667,774 B2* | 2/2010 | Murakami | 348/500 |
| 8,130,327 B2* | 3/2012 | Han et al. | 348/731 |
| 8,243,199 B2* | 8/2012 | Sumiyoshi | H04N 5/4401 348/564 |
| 8,300,151 B2* | 10/2012 | Kim | 348/634 |
| 8,326,291 B2* | 12/2012 | Seo | H04H 20/26 348/385.1 |
| 8,346,989 B2* | 1/2013 | Du et al. | 710/15 |
| 2001/0015771 A1* | 8/2001 | Kishimoto et al. | 348/705 |
| 2003/0071902 A1* | 4/2003 | Allen et al. | 348/211.11 |
| 2004/0003399 A1* | 1/2004 | Cooper | 725/38 |
| 2004/0189879 A1* | 9/2004 | Read | 348/731 |
| 2004/0194134 A1* | 9/2004 | Gunatilake et al. | 725/38 |
| 2006/0085828 A1* | 4/2006 | Dureau et al. | 725/100 |
| 2007/0171306 A1* | 7/2007 | Lowet et al. | 348/565 |
| 2008/0211966 A1 | 9/2008 | Iwamoto | |
| 2008/0238724 A1* | 10/2008 | Shin | G01C 21/3647 340/995.27 |
| 2008/0303767 A1* | 12/2008 | Ludden | G09G 3/3688 345/89 |
| 2011/0109799 A1 | 5/2011 | Murakami | |
| 2015/0156898 A1* | 6/2015 | Shin et al. | 361/679.02 |

* cited by examiner

VIDEO DISPLAY APPARATUS, VIDEO SWITCHING APPARATUS, AND VIDEO DISPLAY METHOD

FIELD

The disclosures herein generally relate to a video display apparatus, a video switching apparatus, and a video display method.

BACKGROUND

A video display apparatus and a video display method have been known that selectively display multiple videos on a display (see, for example, Patent Document 1). This display apparatus includes a switching circuit provided between video output units that output video signals, such as cameras, and a display to display videos. This switching circuit selects a video to be displayed on the display among videos output by the multiple video output units, respectively, and outputs the video signal. Therefore, on the display, among the videos output by the multiple video output units, respectively, only one video is selectively displayed.

Also, before and after switching the video to be displayed on the display among the multiple videos, the display apparatus superposes a video signal output by the switching circuit, with a black mute signal so that the backlight of the display is turned off, to display a black screen on the display, to fix the video on the display. Then, while the video on the display is fixed, the video signal output by the switching circuit is switched among the multiple videos. Therefore, when the video displayed on the display is switched to one of the multiple videos, the video on the display is fixed, and hence, it is possible to avoid displaying disturbed video due to the video switching.

RELATED-ART DOCUMENTS

Patent Documents

[Patent Document 1] Japanese Laid-open Patent Publication No. 2008-99254

However, for the display apparatus and the display method described in Patent Document 1, after having started the fixing on the display by displaying the black screen, to stop displaying the fixed video, and to switch the video displayed on the display to one of the videos input from the multiple video output units, it is necessary to receive as input a synchronization signal of one of the video output units whose video data is used after the switching. In this regard, if the synchronization signal of the video output unit is not detected after the switching, the video displayed on the display cannot be switched from the fixed video to the video from the video output unit, and the fixed video continues to be displayed on the display for a long period.

The present invention provides a video display apparatus and a video switching apparatus that display a video having fixed to avoid displaying disturbed video when the video displayed on the display is switched to one of the videos output from the video output units, respectively, and can stop displaying the fixed video even if a synchronization signal is not input from the video output unit after the switching.

SUMMARY

According to at least one embodiment of the present invention, a video display apparatus includes a plurality of video output units configured to output signals representing first videos captured or received, respectively, and when a predetermined signal is input from an outside, only for a predetermined period, to output signals representing second videos having fixed images, instead of the signals representing the first videos, respectively; a display configured to display a video based on the signal output by one of the plurality of video output units; and a control apparatus configured to output the predetermined signal to the plurality of video output units, and after having output the predetermined signal, to execute switching a signal representing a video output to the display among the signals representing the videos output by the plurality of video output units, respectively, while the video output unit having the signal representing the video output to the display before the switching, and the video output unit having the signal representing the video output to the display after the switching, output the signals representing the second videos, respectively.

According to at least one embodiment of the present invention, a video switching apparatus includes a plurality of video output units configured to output signals representing first videos captured or received, respectively, and when a predetermined signal is input from an outside, only for a predetermined period, to output signals representing second videos having fixed images, instead of the signals representing the first videos, respectively; and a control apparatus configured to output the predetermined signal to the plurality of video output units, and after having output the predetermined signal and before the predetermined period passes, to execute switching a signal representing a video output to the display among the signals representing the videos output by the plurality of video output units, respectively.

Also, according to at least one embodiment of the present invention, a video display method, executed by a control apparatus, includes a first step outputting a predetermined signal to a plurality of video output units configured to output signals representing first videos captured or received, respectively; a second step having the plurality of video output units, when the predetermined signal is input from an outside, only for a predetermined period, output signals representing second videos having fixed images, instead of the signals representing the first videos, respectively; a third step outputting the predetermined signal to the plurality of video output units, and after having output the predetermined signal, switching a signal representing a video output to a display among the signals representing the videos output by the plurality of video output units, respectively, while the video output unit having the signal representing the video output to the display before the switching, and the video output unit having the signal representing the video output to the display after the switching, output the signals representing the second videos, respectively; and a fourth step having the display display the video based on the signal output by one of the plurality of video output units.

According to at least one embodiment of the present invention, when a video displayed on a display is switched among videos output by multiple video output units, by displaying a video having a fixed image, it is possible to avoid displaying disturbed video, and to securely release displaying the video having the fixed image, without receiving as input a synchronization signal from the video output unit after the switching.

DESCRIPTION OF EMBODIMENTS

In the following, specific embodiments of a video display apparatus, a video switching apparatus, and a video display method will be described with reference to the drawings according to the present invention.

Figure 1:
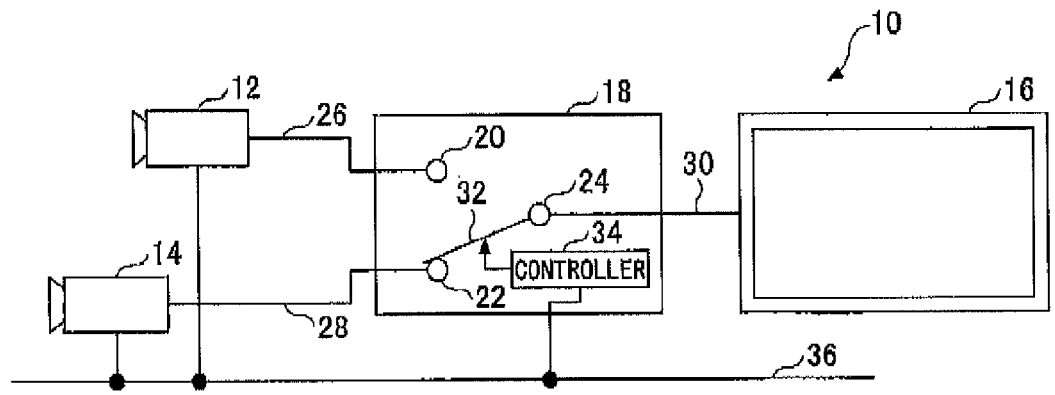
FIG. 1 is a configuration diagram of a video display apparatus according to an embodiment of the present invention.

FIG. 1 illustrates a configuration diagram of a video display apparatus 10 according to an embodiment of the present invention. The video display apparatus 10 in the present embodiment is installed, for example, in a vehicle, and is an apparatus to display a video captured by a camera for vehicle passengers. Note that the video display apparatus 10 may be installed on things other than a vehicle. However, the present embodiment assumes that the video display apparatus 10 is installed in a vehicle.

As shown in FIG. 1, the video display apparatus 10 includes multiple (two in the present embodiment) cameras 12 and 14. The camera 12 and the camera 14 are disposed to have imaging areas different from each other. For example, the cameras 12 and 14 may be placed at the backdoor of the body, at the front bumper or the front grill of the body, or at the door mirror stay, respectively. The cameras 12 and 14 may be digital cameras such as cameras for imaging the front of the vehicle and the front side of the vehicle, or cameras for imaging dead angles from the driver around front tires and/or rear tires. The cameras 12 and 14 are video output units that can output signals (referred to as "captured video signals" below) that represent videos being captured (referred to as "captured videos" below), respectively.

The video display apparatus 10 also includes a display 16. The display 16 selectively displays only one of videos captured by the cameras 12 and 14. The display 16 is disposed at a position (for example, a center panel) visible from vehicle passengers (especially, from the driver). Note that the display 16 may also be used as a display for navigation, or may be a multi-information display.

The video display apparatus 10 also includes a control apparatus 18. The control apparatus 18 includes two video input terminals 20 and 22 and one video output terminal 24. The camera 12 and the video input terminal 20 are connected with each other via a first signal line 26. A video signal that represents a video output by the camera 12 is input into the control apparatus 18 via the first signal line 26. Also, the camera 14 and the video input terminal 22 are connected with each other via a first signal line 28. A video signal that represents a video output by the camera 14 is input into the control apparatus 18 via the first signal line 28. Furthermore, the video output terminal 24 and the display 16 are connected with each other via a third signal line 30.

The control apparatus 18 includes a switching device 32 and a controller 34. The switching device 32 selects one of the two video input terminals 20 and 22, to have the selected video input terminal 20 or 22 connected with the video output terminal 24. Namely, the switching device 32 selects a video signal that represents a video to be displayed on the display 16, among the video signals that represent videos output from the cameras 12 and 14, respectively, and outputs the selected video signal to the display 16.

The controller 34 has a function to control switching the switching device 32, based on a signal from the outside (for example, a signal of a switching operation by the driver) and/or a traveling state of the vehicle (for example, whether it is turnaround traveling). The captured video signal selected by the control apparatus 18 among the captured video signals output by the cameras 12 and 14, respectively, is input into the display 16 via the third signal line 30. The display 16 displays the video based on the captured video signal input from the control apparatus 18 via the third signal line 30.

The camera 12 and the control apparatus 18 are connected with each other via a communication line 36, which is provided separately from the first signal line 26. Also, the camera 14 and the control apparatus 18 are connected with each other via the communication line 36, which is provided separately from the second signal line 28. Namely, the camera 12, the camera 14, and the control apparatus 18 are connected with each other via the communication line 36. The communication line 36 is a line of a LAN (Local Area Network), for example, a CAN (Controller Area Network).

Each of the cameras 12 and 14 has an electronic control unit installed that has a function to receive and transmit a signal by a communication protocol in accordance with the communication line 36. The cameras 12 and 14 also have functions to set video signals output on the first signal line 26 and the second signal line 28, respectively, by a predetermined video signal, which will be described later, instead of captured video signals that represent captured videos that have been captured. Also, the controller 34 of the control apparatus 18 has a function to receive and transmit a signal by the communication protocol in accordance with the communication line 36. The camera 12 and the control apparatus 18 can receive and transmit a signal with each other via the communication line 36. Also, the camera 14 and the control apparatus 18 can receive and transmit a signal with each other via the communication line 36.

Figure 2:
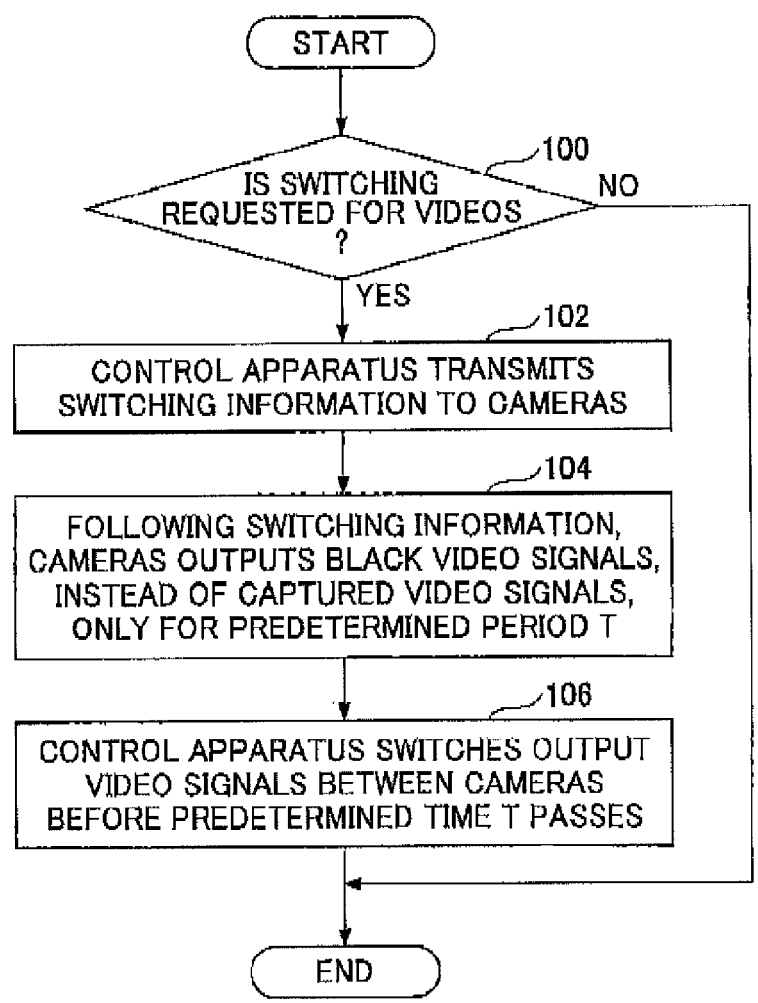
FIG. 2 is a flowchart of an example of a control routine executed in a video display apparatus illustrated in FIG. 1.
Figure 3:
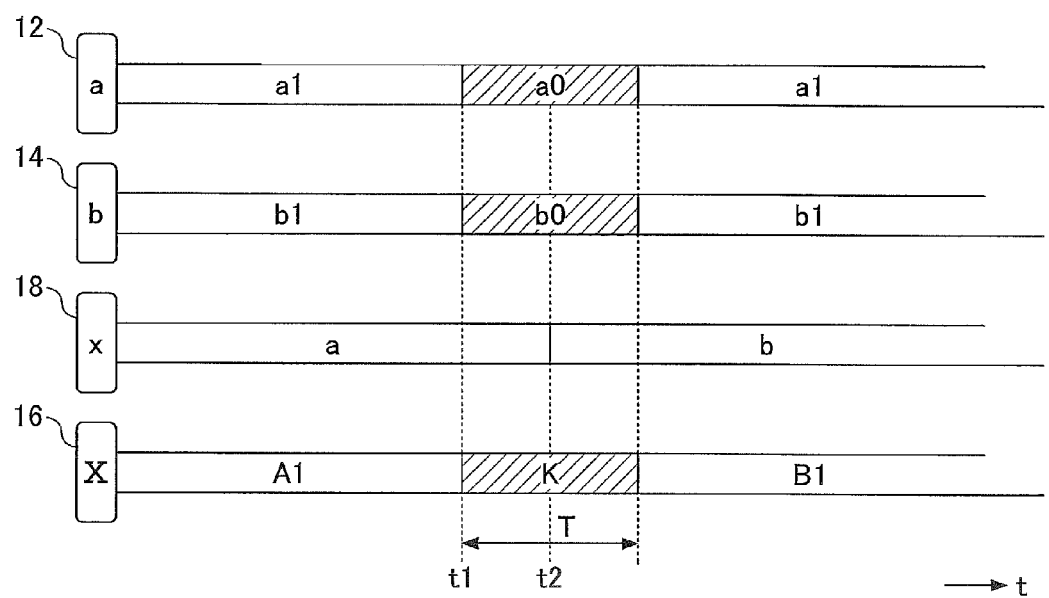
FIG. 3 is a timing chart implemented in a video display apparatus illustrated in FIG. 1.

In the following, with reference to FIGS. 2 and 3, operations of the video display apparatus 10 will be described according to the present embodiment. FIG. 2 illustrates a flowchart of an example of a control routine executed in the video display apparatus 10 according to the present embodiment. Also, FIG. 3 illustrates a timing chart implemented in the video display apparatus 10 according to the present embodiment.

In the video display apparatus 10 in the present embodiment, to control switching the switching device 32, the controller 34 of the control apparatus 18 determines whether switching is requested for the video displayed on the display 16 between captured videos being captured by the cameras 12 and 14, respectively, based on a signal from the outside and a traveling state of the vehicle (Step 100). Specifically, the controller 34 determines whether switching is requested for the video displayed on the display 16, from a captured video captured by the camera 12 to a captured video to be captured by the camera 14, or conversely, from a captured video captured by the camera 14 to a captured video to be captured by the camera 12.

If determining that switching is not requested for the video displayed on the display 16 at Step 100, the controller 34 ends the current routine, without processing the rest of the steps. On the other hand, if determining that switching is requested for the video displayed on the display 16 at Step 100, the controller 34 first generates information that the video displayed on the display 16 is to be switched (referred to as "switching information" below), and transmits the switching information on the communication line 36 (Step 102). The switching information transmitted on the communication line 36 from the controller 34 of the control apparatus 18 is input into the electronic control units of the cameras 12 and 14, respectively.

When receiving as input the switching information output by the controller 34 of the control apparatus 18 via the communication line 36, the electronic control units of the cameras 12 and 14 detect that the video displayed on the display 16 is to be switched. Then, following the switching information, the electronic control units switch video signals output by the cameras 12 and 14, from captured video signals representing captured videos, to signals (referred to as "black video signals" below) representing videos of fixed images having the entire display areas blacked out (referred to as black videos), respectively (Step 104). Namely, in this case, the cameras 12 and 14 output the black video signals to the first signal line 26 and the second signal line 28, instead of the captured video signals representing the captured videos, respectively. Note that the black videos and the black video signals may be provided in the cameras 12 and 14 in advance.

The switching information output by the controller 34 is received by the cameras 12 and 14 at virtually the same timing. Also, after having received the switching information from the controller 34, the cameras 12 and 14 output the black video signals only for a predetermined period T, respectively. The length of the period T during which the camera 12 outputs the black video signal is virtually the same as the length of the period T during which the camera 14 outputs the black video signal. Therefore, timing when the camera 12 outputs the black video signal is virtually the same as timing when the camera 14 outputs the black video signal. Also, the black video based on the black video signal output by the camera 12 is virtually the same as the black video based on the black video signal output by the camera 14.

The controller 34 of the control apparatus 18 has information about the period T during which the cameras 12 and 14 keep outputting the black video signals, and grasps the period T in advance. After having transmitted the switching information generated at Step 102 on the communication line 36, and before the period T passes, the controller 34 sends a command to the switching device 32 to switch the selection of the video input terminals 20 and 22 to be connected with the video output terminal 24, namely to switch the video to be displayed on the display 16 between that output by the camera 12, and that output by the camera 14 (Step 106).

Once the command to the switching device 32 is executed, the video signals output to the display 16 from the cameras 12 and 14 are switched between the cameras 12 and 14, and hence, the video displayed on the display 16 is switched between that output by the camera 12, and that output by the camera 14.

In this way, when switching is requested for the video displayed on the display 16, the video display apparatus 10 first has the control apparatus 18 transmit the switching information that the video is to be switched, to the cameras 12 and 14 via the communication line 36. Also, the video display apparatus 10 has the cameras 12 and 14 switch the video signals to be output, from captured video signals to the black video signals following the switching information, respectively, and then, continue to output the black video signals for the predetermined period T. Then, after the cameras 12 and 14 start outputting the black video signals, respectively, namely, after the controller 34 has transmitted the switching information to the cameras 12 and 14, and before the predetermined period T passes, the video display apparatus 10 has the control apparatus 18 switch the video to be displayed on the display 16 between that output by the camera 12, and that output by the camera 14, by the switching operation of the switching device 32.

Namely, for example, as shown in FIG. 3, when a video X being displayed on the display 16 is to be switched from a captured video A1 based on a captured video signal a1 output by the camera 12, to a captured video B1 based on a captured video signal b1 output by the camera 14, following the switching information from the control apparatus 18, the cameras 12 and 14 immediately switch outputting video signals a and b from captured video signals a1 and b1 to black video signals a0 and b0 (at time t1), and after that, continue to output the black video signals a0 and b0 for the predetermined period T, respectively. Then, after having transmitted the switching information to the cameras 12 and 14, and before the predetermined period T passes, the controller 34 of the control apparatus 18 switches a video signal x representing the video X output to the display 16 and being displayed on the display 16, from the video signal a output by the camera 12, to the video signal b output by the camera 14, by the switching operation of the switching device 32 (at time t2).

In this configuration, when the video signal x representing the video X being displayed on the display 16 is switched between the video signal a output by the camera 12 and the video signal b output by the camera 14, before and after switching the video signal x, the video signals a and b output by the cameras 12 and 14 are the black video signals a0 and b0 that represent the black videos having the entire display areas blacked out to hold fixed images. As described above, the black video based on the black video signal a0 and the black video based on the black video signal b0 are virtually the same video K.

In this regard, before and after the video signal x switches between the video signal a output by the camera 12 and the video signal b output by the camera 14, the video X being displayed on the display 16 continues to be the black video K having the entire display area blacked out to hold fixed images. Namely, while the black video K is being displayed on the display 16 as the video X, the video X to be displayed on the display 16 is switched between a video A based on the video signal a output by the camera 12, and a video B based on the video signal b output by the camera 14.

Therefore, according to the video display apparatus 10 in the present embodiment, when the video X being displayed on the display 16 is switched between the video A based on the video signal a output by the camera 12 and the video B based on the video signal b output by the camera 12, the black video K continues to be displayed on the display 16 before and after the switching, and hence, it is possible to avoid displaying disturbed video due to the switching.

Also, in the video display apparatus 10, after the video X being displayed on the display 16 has changed to the black video K, displaying the black video K is released, and the video X being displayed on the display 16 is switched from the black video K to the captured video A1 or B1 captured by the camera 12 or 14, at the timing when the predetermined period T passes. In this regard, after having started displaying the black video K on the display 16, to release displaying the black video K and to switch the video X being displayed to the captured video A1 or B1, it is not necessary to input a synchronization signal of the camera 12 or 14, whose video is to be used after the video switching, into the controller 34 of the control apparatus 18.

Therefore, according to the video display apparatus 10 in the present embodiment, after having started displaying the black video K on the display 16, regardless of availability of a synchronization signal of the camera 12 or 14 whose video is to be used after the video switching, displaying the black video K can be released when the predetermined period T passes, and the release of displaying the black video K can be implemented, without having the synchronization signal of the camera 12 or 14 input into the controller 34.

Therefore, according to the video display apparatus 10 in the present embodiment, when the video X being displayed on the display 16 is switched between the video A by the camera 12 and the video B by the camera 14, by continuing to display the black video K before and after the switching, it is possible to avoid displaying disturbed video due to the switching, and to securely release displaying the black video K on the display 16, without having the synchronization signal of the camera 12 or 14 input into the controller 34.

Note that in the above embodiments, the cameras 12 and 14 function as "video output units". The captured videos captured and output by the cameras 12 and 14 function as "first videos". The black videos having fixed blacked-out images in advance, to be output by the cameras 12 and 14 function as "second videos". The switching information functions as a "predetermined signal". The first signal line 26 and the second signal line 28 each function as a "first signal line". Also, the communication line 36 functions as a "second signal line". Also, the cameras 12 and 14 and the control apparatus 18 function as a "video switching apparatus".

Also, in the above embodiments, Step 102 in the routine illustrated in FIG. 2 functions as a "first step". Step 104 functions as a "second step". Step 106 functions as a "third step". Also, displaying a video based on a video signal output by one of the cameras 12 and 14 on the display 16, functions as a "fourth step".

Incidentally, in the above embodiments, the black video K having the entire display area blacked out is used as a video having a fixed image based on the black video signal output by the cameras 12 and 14. However, the present invention is not limited to that, but as a video having a fixed image based on the black video signal output by the cameras 12 and 14, a video having the entire display area whited out, or colored by a predetermined color may be used, or a video having a predetermined pattern may be used. However, even in such a modified embodiment, it is desirable that a video having the fixed image based on the black video signal output by the camera 12 be virtually the same as a video having the fixed image based on the black video signal output by the camera 14.

Also, in the above embodiments, the switching information is transmitted from the control apparatus 18 to the cameras 12 and 14 via the communication line 36 at virtually the same time, and the timing when the camera 12 outputs the black video signal in response to the switching information is virtually the same as the timing when the camera 14 outputs the black video signal in response to the switching information. Then, after having transmitted the switching information to the cameras 12 and 14 via the communication line 36, before the period T passes during which the cameras 12 and 14 continue to output the black video signal, the control apparatus 18 switches the video being displayed on the display 16 between that output by the camera 12 and that output by the camera 14.

However, the present invention is not limited to that, but it is sufficient to have an overlapped period between the timing when the camera 12 outputs the black video signal in response to the switching information, and the timing when the camera 14 outputs the black video signal in response to the switching information; and the transmission of the switching information from the control apparatus 18 to the cameras 12 and 14 may be executed at different timings between the cameras 12 and 14. In such a modified embodiment, after having transmitted the switching information to the cameras 12 and 14 via the communication line 36, the control apparatus 18 switches the video being displayed on the display 16 between that output by the camera 12 and that output by the camera 14 during the overlapped period, namely, while both the camera 12 and the camera 14 output the black video signals.

Also, in the above embodiments, the transmission of the switching information from the control apparatus 18 to the cameras 12 and 14, is executed via the communication line 36, which is a line of a LAN. However, the present invention is not limited to that, but, a dedicated line that connects the control apparatus 18 with the camera 12, which is different from the first signal line 26, and another dedicated line that connects the control apparatus 18 with the camera 14, which is different from the second signal line 28, may be separately provided, on which the switching information may be transmitted, respectively.

Also, in the above embodiments, the video display apparatus 10 includes the cameras 12 and 14. However, the present invention is not limited to that, but the video display apparatus 10 may include three or more cameras.

Also, in the above embodiments, as video output units to output videos, the cameras 12 and 14 are used that capture videos for predetermined areas, respectively. However, the present invention is not limited to that, but as a video output unit to output a video, a receiver that receives and outputs television broadcasts may be used. Note that in such a modified embodiment, a camera and a receiver may coexist in the video output unit.

The present application is based on Japanese Priority Application No. 2014-107423, filed on May 23, 2014, the entire contents of which are hereby incorporated by reference.

The invention claimed is:

1. A video display apparatus, comprising:
    a first video output unit and a second video output unit configured to output signals representing first videos and second videos captured or received, respectively, and when a predetermined signal is input from an outside, only for a predetermined switching period, both the first video output unit and the second video output unit are configured to output signals representing third videos having no content fixed images, instead of the signals representing the first and second videos, respectively;
    a display configured to display a video based on the signals output by one of the first and second video output units; and
    a control apparatus configured to output the predetermined signal to the first and second video output units, and after having output the predetermined signal, to execute switching a signal representing a video output to the display among the signals representing the videos output by the first and second video output units, respectively, so that at the start of the switching period the video output to the display is the no content fixed image output from the first video output unit, that at a middle portion of the switching period the signal output to the display is switched to the no content fixed image output from the second video output unit, and that at the end of the switching period, the signal output to the display is the second video signal output from the second video output unit, respectively, without receiving, as input, a sync signal from any one of the video output units.

2. The video display apparatus, as claimed in claim 1, wherein the control apparatus outputs the predetermined signal to the first and second video output units at a same time, and after having output the predetermined signal and before the predetermined switching period passes, executes the switching of the signals representing the video output to the display among the signals representing the videos output by the first and second video output units.

3. The video display apparatus, as claimed in claim 1, wherein each of the first and second video output units, when receiving as input the predetermined signal output from the control apparatus, outputs a signal representing a same image as the third video.

4. The video display apparatus, as claimed in claim 1, wherein the control apparatus and the first and second video output units are connected with each other via respective first signal lines on which the signals representing the videos are transmitted, and are connected with each other via a second signal line on which the signal representing the predetermined signal is transmitted.

5. A video switching apparatus, comprising:
  a first video output and a second video output unit configured to output signals representing first videos and second videos captured or received, respectively, and when a predetermined signal is input from an outside, only for a predetermined switching period, both the first video output unit and the second video output unit are configured to output signals representing third videos having no content fixed images, instead of the signals representing the first and second videos, respectively; and
  a control apparatus configured to output the predetermined signal to the first and second video output units, and after having output the predetermined signal and before the predetermined switching period passes, at the start of the switching period, the video output is the no content fixed image output from the first video output unit, at a middle portion of the switching period the signal output is switched to the no content fixed image output from the second video output unit, and at the end of the switching period, the signal output is the second video signal from the second video output unit, respectively, without receiving, as input, a sync signal from any one of the video output units.

6. A video display method, executed by a control apparatus, the method comprising:
  a first step of outputting a predetermined signal to a first video output unit and to a second video output unit configured to output signals representing first videos and second videos captured or received, respectively;
  a second step of having the plurality of video output units, when the predetermined signal is input from an outside, only for a predetermined switching period, output signals representing third videos having no content fixed images, instead of the signals representing the first and second videos, respectively;
  a third step of outputting the predetermined signal to the plurality of video output units, and after having output the predetermined signal, at the start of the switching period, outputting the no content fixed image from the first video output unit to a display, at a middle portion of the switching period, outputting to the display is switched to the no content fixed image from the second video output unit, and at an end of the switching period, outputting to the display is switched to the second video signal from the second video output unit, respectively, without receiving, as input, a sync signal from any one of the video output units; and
  a fourth step of having the display display the video based on the signal output by one of the first and second video output units.

* * * * *